(12) United States Patent
Tang et al.

(10) Patent No.: US 12,095,340 B2
(45) Date of Patent: Sep. 17, 2024

(54) HYDROGEN EXPANDER MAGNETIC GENERATOR APPARATUS AND METHOD

(71) Applicant: Air Products and Chemicals, Inc., Allentown, PA (US)

(72) Inventors: Genglin Tang, Mason, OH (US); Candice Daibes Silvestre, Center Valley, PA (US); Ethan D. Eiswerth, Macungie, PA (US); Robert E. Benton, Jr., Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 385 days.

(21) Appl. No.: 17/546,409

(22) Filed: Dec. 9, 2021

(65) Prior Publication Data

US 2023/0188024 A1   Jun. 15, 2023

(51) Int. Cl.
*H02K 55/02* (2006.01)
*H02K 7/09* (2006.01)
*H02K 9/10* (2006.01)

(52) U.S. Cl.
CPC .............. *H02K 55/02* (2013.01); *H02K 7/09* (2013.01); *H02K 9/10* (2013.01)

(58) Field of Classification Search
CPC   H02K 55/02; H02K 7/09; H02K 9/10; H02K 1/30; H02K 5/124; H02K 1/278; H02K 5/08; H02K 7/003; H02K 9/12; H02K 7/1823; H02K 5/161; F01D 15/10
USPC ....... 310/55, 156.23, 156.28, 156.29, 156.31
See application file for complete search history.

(56) References Cited

U.S. PATENT DOCUMENTS

| | | | | |
|---|---|---|---|---|
| 3,531,670 | A * | 9/1970 | Loudon | H02K 21/16 310/156.28 |
| 5,497,615 | A * | 3/1996 | Noe | H02K 7/083 60/39.511 |
| 5,628,191 | A * | 5/1997 | Kueck | F02C 1/04 60/682 |
| 6,255,752 | B1 | 7/2001 | Werner | |
| 6,464,230 | B1 | 10/2002 | Tong et al. | |
| 6,711,805 | B2 * | 3/2004 | Joho | H02K 1/223 29/598 |
| 9,024,460 | B2 * | 5/2015 | Xu | F01D 15/10 290/52 |
| 2007/0236094 | A1 | 10/2007 | Kaminski et al. | |
| 2008/0246281 | A1 * | 10/2008 | Agrawal | F01D 15/005 415/177 |

(Continued)

FOREIGN PATENT DOCUMENTS

| | | |
|---|---|---|
| CN | 104948585 A | 9/2015 |
| CN | 107620616 A | 1/2018 |

(Continued)

*Primary Examiner* — Ahmed Elnakib
(74) *Attorney, Agent, or Firm* — Robert A. Diaz (57) ABSTRACT

A hydrogen expander magnetic generator apparatus can include a magnetic generator to recover energy. Embodiments can utilize a permanent magnetic motor (PM) and energy conversion system (ECS) for converting energy from a rotating shaft of a turboexpander. Some embodiments can position magnets on the shaft such that the magnets are protected from exposure to hydrogen to avoid damage to the magnets. Some embodiments can include retrofitting of a pre-existing expander to remove an oil brake and replace it with an embodiment of the PM and ECS.

17 Claims, 5 Drawing Sheets

(56) References Cited

U.S. PATENT DOCUMENTS

| | | | |
|---|---|---|---|
| 2012/0306206 A1 | 12/2012 | Agarawal et al. | |
| 2013/0157154 A1* | 6/2013 | Hausmann | H01M 8/04111 |
| | | | 429/415 |
| 2014/0319841 A1 | 10/2014 | Xu et al. | |
| 2016/0281705 A1 | 9/2016 | Adler et al. | |
| 2023/0188024 A1* | 6/2023 | Tang | H02K 1/30 |
| | | | 310/55 |

FOREIGN PATENT DOCUMENTS

| | | |
|---|---|---|
| CN | 210530931 U | 5/2020 |
| CN | 111313571 A | 6/2020 |
| CN | 211314296 U | 8/2020 |
| CN | 112287493 A | 1/2021 |
| CN | 112361711 A | 2/2021 |
| CN | 112361713 A | 2/2021 |
| CN | 112392561 A | 2/2021 |
| CN | 212518619 U | 2/2021 |
| CN | 213043485 U | 4/2021 |
| CN | 112564379 B | 6/2021 |
| EP | 3264571 | 1/2018 |
| JP | 2010048215 | 3/2010 |

\* cited by examiner

HYDROGEN EXPANDER MAGNETIC GENERATOR APPARATUS AND METHOD

FIELD OF THE INVENTION

The present invention relates to turbomachinery used in conjunction with hydrogen applications. Some embodiments can be utilized in generator-loaded turboexpanders, for example. Some embodiments of an apparatus and method are provided for expansion of hydrogen that utilize a magnetic generator for energy conversion. Some embodiments can be utilized in cryogenic equipment engineered for the transfer and compression of hydrogen for fuel applications for land, air and/or marine vehicles. Other embodiments can be utilized for power recovery in industrial gas processing environments or can be configured to facilitate refrigeration and power recovery in air separation and liquefaction facilities.

BACKGROUND OF THE INVENTION

Industrial devices can include generators and related components that can be used to generate electricity, which can be utilized to power one or more devices in a plant or be used to transmit electricity to a grid for use by others. Examples of technology related to such industrial systems can be appreciated from U.S. Pat. Nos. 6,464,230 and 6,255,752, U.S. Pat. App. Pub. No. 2016/0281705 and published Chinese Pat. App. Pub. Nos. CN112564379, CN112392561, CN112361713, CN112361711, CN112287493, CN111313571, CN107620616, and CN104948585, Chinese Utility Model Nos. CN210530931 U, CN211314296 U, CN213043485 U, CN212518619 U, and Japanese Pat. App. Pub. No. JP2010048215.

Some hydrogen expanders utilize an oil brake (which can also be referred to as an expander-dynamometer). The oil brake can be positioned so that the power generated by the expander is dissipated as heat in the oil brake, which can be supported by a lube oil system.

SUMMARY

We determined that a hydrogen expander can utilize a magnetic motor and energy conversion system (MMECS) for converting energy from a rotating shaft of the expander. Some embodiments can be used in conjunction with a hydrogen turboexpander, for example. We determined that embodiments can provide significant improvement over an oil brake system by providing a lower unit cost, a smaller footprint, and less maintenance as compared to conventional oil brake systems (e.g. an oil brake). Embodiments can also be more environmentally and financially beneficial as compared to oil brake systems. For example, energy recovery that can be obtained via embodiments can generate revenue for an operator while also avoiding (or at least minimizing) the use of oil.

We also determined that, to utilize a MMECS in a hydrogen expander, it can be important to design the MMECS to avoid exposing magnets to hydrogen because hydrogen can attack rare earth magnets. For instance, if a rare earth metal magnet is exposed to hydrogen, the hydrogen can facilitate the decrepitation process by interacting with the magnet to physically break down the magnet material and negatively impact the magnetic properties of the material. Embodiments of our hydrogen expander utilizing an MMECS can be configured to provide separation of the magnet from the hydrogen environment to help ensure reliable operation and help avoid degradation or damage to the magnets that would result from exposure to hydrogen.

A hydrogen expander magnetic generator apparatus is provided. The apparatus can include a rotatable shaft extending from an expander side adjacent to a seal. The shaft can have a plurality of magnets attached thereto in an electricity generation side region of the shaft. A sleeve can be attached to the shaft via at least one sleeve attachment mechanism such that the magnets are completely enclosed between the sleeve and the shaft to prevent hydrogen ingress into the magnets.

The complete enclosure of the magnets between the shaft and the sleeve can be provided via the body of the shaft and the sleeve as well as the one or more sleeve attachment mechanisms. The magnets can be completely enclosed to avoid hydrogen from contacting the magnets or interacting the magnets so that the hydrogen is not able to physically break down the magnet material and negatively impact the magnetic properties of the material.

The magnets can be permanent magnets or other type of suitable magnets. In some embodiments, the magnets can include north polarity magnets and south polarity magnets. The magnets can being positioned along a circumference of the shaft or a periphery of the shaft so each north polarity magnet is between immediately adjacent south polarity magnets and each south polarity magnet is between immediately adjacent north polarity magnets along a perimeter or circumference of the shaft.

Embodiments of the apparatus can include other elements. For example, there can be at least one radial bearing positioned adjacent the shaft between the seal and the magnets and at least one axial bearing positioned adjacent the shaft between the seal and the magnets. The at least one radial bearing can be a magnetic radial bearing and the at least one axial bearing can be a magnetic axial bearing. In other embodiments, each radial bearing can be other types of radial bearings and each axial bearing can be another type of axial bearing.

The sleeve attachment mechanism can include a number of different sleeve attachment mechanisms or combinations of such mechanisms. For example, the at least one sleeve attachment mechanism can include one or more of: bonding attachments, sleeve end joints, an overcoating, sleeve end cuffs, and sealing elements. For instance, some embodiments can include at least two of: bonding attachments, sleeve end joints, an overcoating, sleeve end cuffs, and sealing elements.

Embodiments of the hydrogen expander magnetic generator apparatus can also include a coil stator spaced apart from the shaft such that the sleeve is positioned between the coil stator and the shaft and there is a gap defined between the coil stator and the sleeve. The seal can be positioned such that a hydrogen cooling flow is passable along the shaft from the expander side through the gap. There can also be at least one radial bearing positioned adjacent the shaft between the seal and the magnets and at least one axial bearing positioned adjacent the shaft between the seal and the magnets. The seal can be positioned such that the hydrogen cooling flow passes along the at least one radial bearing and the at least one axial bearing as is passes from the seal to the gap.

The hydrogen expander magnetic generator apparatus can be structured as a turboexpander, can be incorporated into a turboexpander, or can be configured as another type of hydrogen expander or can be incorporated into another type of hydrogen expander.

A method of generating electricity via expansion of hydrogen via a hydrogen expander magnetic generator apparatus is also provided. Embodiments of the method can include expanding hydrogen within an expander side of an expander. The expander can have a rotatable shaft extending from the expander side adjacent a seal. The shaft can have a plurality of magnets attached thereto in an electricity generation side region of the shaft. The expander can also include a sleeve attached to the shaft via at least one sleeve attachment mechanism such that the magnets are completely enclosed between the sleeve and the shaft. The expanding of the hydrogen can be performed such that a hydrogen cooling flow passes along the shaft to the electricity generation side region of the shaft.

In some embodiments, the hydrogen cooling flow can pass between a gap defined between the sleeve and a stator positioned adjacent the sleeve and spaced apart from the sleeve. The stator can be a coil stator, for example. The hydrogen cooling flow can pass along at least one radial bearing and at least one axial bearing as the hydrogen cooling flow passes along the shaft to the electricity generation side region of the shaft in some embodiments. The at least one radial bearing can be between the seal and the magnets and the at least one axial bearing can be between the seal and the magnets. The magnets can be permanent magnets.

In some embodiments, the sleeve is attached to the shaft via the at least one sleeve attachment mechanism being provided at opposite end regions of the sleeve. The at least one sleeve attachment mechanism can include one or more of: bonding attachments, sleeve end joints, an overcoating, sleeve end cuffs, and sealing elements. For example, the at least one sleeve attachment mechanism can include at least two of: bonding attachments, sleeve end joints, an overcoating, sleeve end cuffs, and sealing elements.

A hydrogen expander magnetic generator apparatus is also provided. The apparatus can include a rotatable shaft extending from an expander side adjacent a seal. The shaft can have a plurality of permanent magnets attached thereto in an electricity generation side region of the shaft. A sleeve can be attached to the shaft via at least one sleeve attachment mechanism such that the magnets are completely enclosed between the sleeve and the shaft. The complete enclosure of the magnets between the shaft and the sleeve can be provided via the body of the shaft and the sleeve as well as the one or more sleeve attachment mechanisms. The magnets can be completely enclosed to avoid hydrogen from contacting the magnets or interacting the magnets so that the hydrogen is not able to physically break down the magnet material and negatively impact the magnetic properties of the material. A stator can be spaced apart from the shaft such that the sleeve is positioned between the stator and the shaft and there is a gap defined between the stator and the sleeve. The seal can be positioned such that a hydrogen cooling flow is passable along the shaft from the expander side through the gap. At least one radial bearing can be positioned adjacent the shaft between the seal and the magnets. At least one axial bearing can be positioned adjacent the shaft between the seal and the magnets. The seal can be positioned such that the hydrogen cooling flow passes along the at least one radial bearing and the at least one axial bearing as the hydrogen cooling flow passes from the seal to the gap.

The hydrogen expander magnetic generator apparatus can be a turboexpander or incorporated in a turboexpander. In other embodiments, the hydrogen expander magnetic generator apparatus can be a hydrogen expander or incorporated into a hydrogen expander.

In some embodiments, the at least one radial bearing includes an oil bearing or a magnetic bearing and the at least one axial bearing includes a magnetic bearing or an oil bearing. The sleeve can be attached to the shaft via the at least one sleeve attachment mechanism provided at opposite end regions of the sleeve where the at least on sleeve attachment mechanism is selected from the group consisting of: bonding attachments, sleeve end joints, an overcoating, sleeve end cuffs, sealing elements, and combinations thereof.

Other details, objects, and advantages of our hydrogen expander magnet generator apparatus and methods of making and using the same will become apparent as the following description of certain exemplary embodiments thereof proceeds.

BRIEF DESCRIPTION OF THE DRAWINGS

Exemplary embodiments of our hydrogen expander magnetic generator apparatus and methods of making and using the same are shown in the drawings included herewith. It should be understood that like reference characters used in the drawings may identify like components.

DETAILED DESCRIPTION

Figure 1:
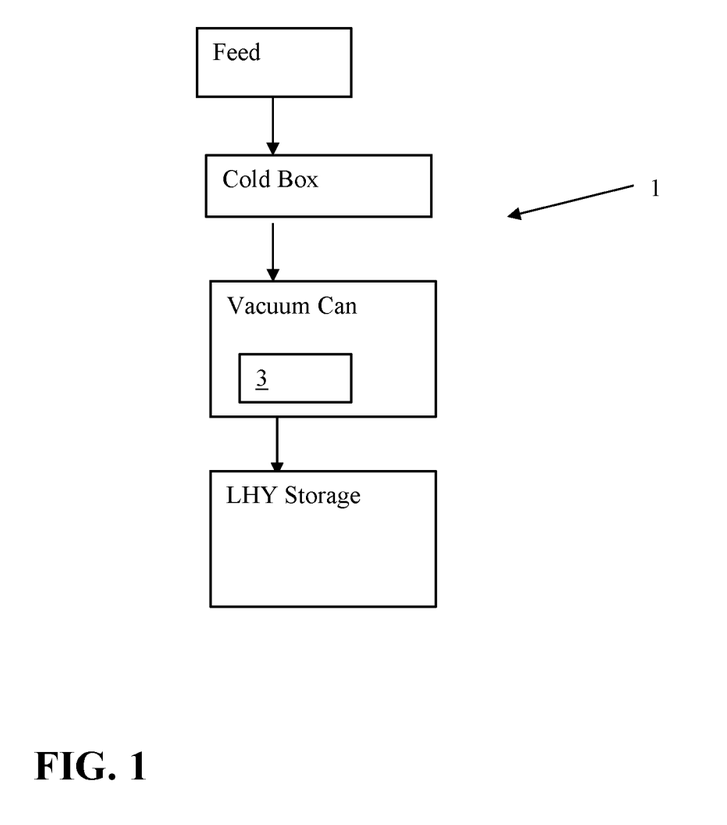
FIG. 1 is a block diagram of an exemplary embodiment of a plant 1 that can include one or more embodiments of our hydrogen expander magnetic generator apparatus 3.

Referring to FIG. 1, a plant can be configured to utilize hydrogen in cryogenic operation as well as other types of operations. In some embodiments, the plant 1 can be configured to include an assembly that is configured so that a feed of hydrogen can be fed to a cold box to be cooled and subsequently fed to a vacuum can for expansion via one or more expanders. At least one of the expanders can be a hydrogen expander magnetic generator apparatus 3 or can include such an apparatus 3. In some embodiments, the expander can be a turboexpander having an expander magnetic generator apparatus 3 incorporated therein, for example. The plant can utilize one or more hydrogen expander magnetic generator apparatuses 3 (e.g. all of the expanders can be hydrogen expander magnetic generator apparatuses 3 or can incorporate a hydrogen expander magnetic generator apparatus 3).

The hydrogen output from the vacuum is then fed to at least one hydrogen storage vessel for on-site storage and/or for storage within a trailer for being transported to another destination via rail, roadway, and/or waterway. In FIG. 1, such one or more storage units are indicated by "LHY Storage", which refers to a storage unit configuration for storage of liquid hydrogen or within at least one vessel of the plant 1 and/or for storage in a trailer filling unit for use in filling trailers with liquid hydrogen for transport to one or more fuel stations or other destinations. In some embodiments, the storage unit LHY Storage can include one or more vessels configured for storage of gaseous hydrogen in addition to one or more liquid hydrogen storage vessels or as an alternative to use of liquid hydrogen storage vessels.

Embodiments of the plant 1 can be configured as industrial plants or other types of plants that can include at least one hydrogen liquefaction unit, a cryo-compressed hydrogen storage unit, and/or at least one hydrogen liquefier assembly. For instance, some embodiments of the plant can be considered a liquid hydrogen plant. As another example, some embodiments of the plant 1 can be an industrial plant that includes at least one hydrogen liquefaction unit.

Figure 2:
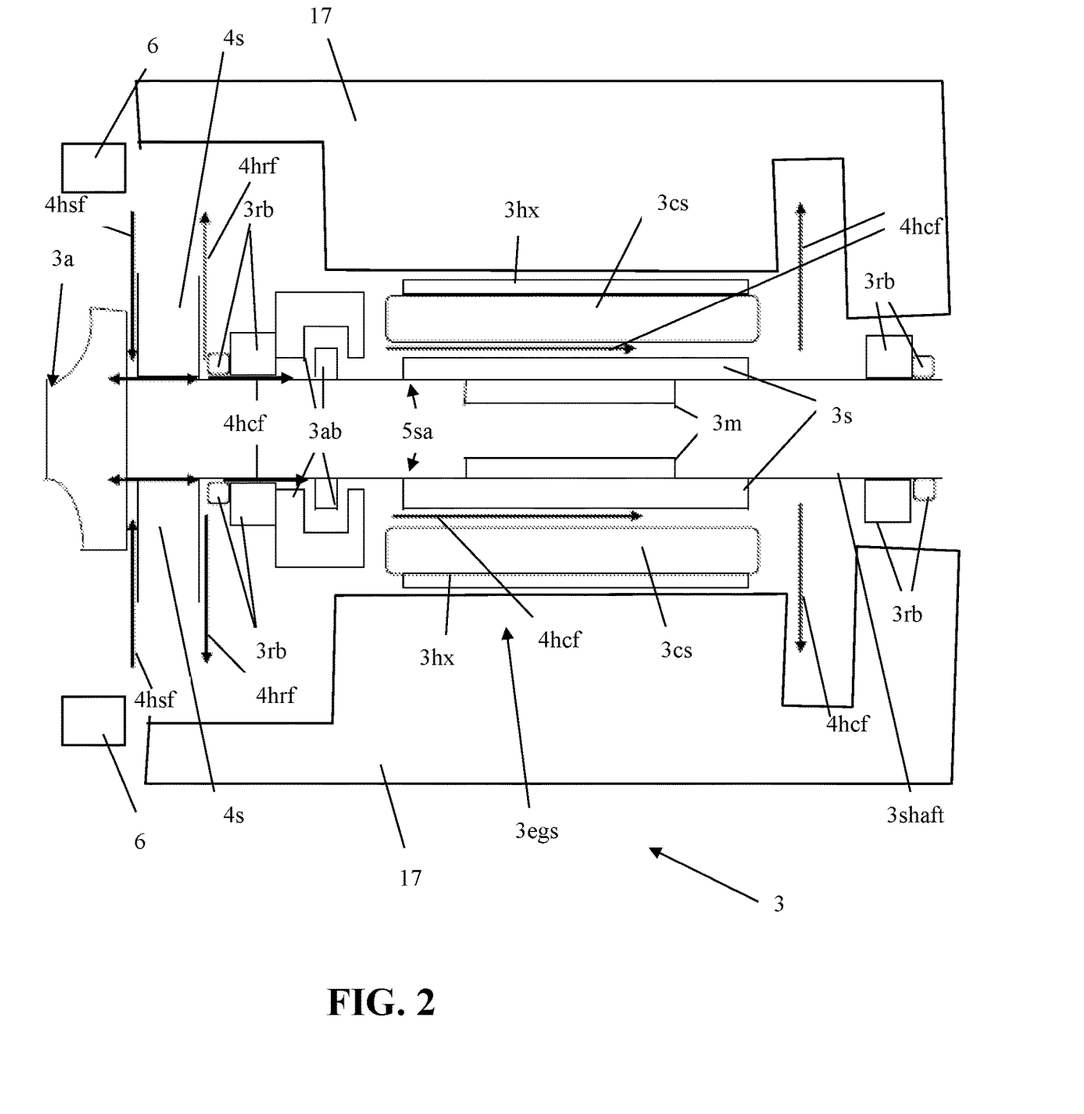
FIG. 2 is a schematic diagram of the exemplary embodiment of the hydrogen expander magnetic generator apparatus 3 utilized in the exemplary embodiment of the plant 1 shown in FIG. 1.

FIG. 2 schematically illustrates an exemplary embodiment of a hydrogen expander magnetic generator apparatus 3 that can be utilized in embodiments of the plant 1. The expander side 3a of the expander is configured to rotate the shaft 3*shaft* as hydrogen is expanded in the chamber of the expander side 3a of the expander. The expander side 3a can include a housing or casing 6 that is positioned to define the chamber in which the hydrogen can be expanded. A seal 4s can be positioned between the expander side and an electricity generation side 3egs of the hydrogen expander magnetic generator apparatus 3 to help entrain the hydrogen within the expander side 3a and help encase the electricity generation side 3egs so that rotation of the shaft 3*shaft* can be utilized for generation of electricity.

The electricity generation side 3egs can include a casing or housing 17, which can be positioned to house the magnetic motor and energy conversion system (MMECS) or at least a portion of the MMECS. The casing or housing 17 can be positioned adjacent the seal 4s and a portion of the casing 6 of the expander side 3a that defines the cavity in which the hydrogen is expanded in the expander side to help encase the electricity generation side 3egs so that rotation of the shaft 3*shaft* can be utilized for generation of electricity.

The electricity generation side 3egs of the apparatus can include radial bearings 3rb and axial bearings 3ab positioned between the seal 4s and an electricity generation portion of the shaft. Radial bearings 3rb and/or axial bearings 3ab can also be positioned on an opposite side of the electricity generation portion of the shaft so that this portion is between proximal side radial bearings 3rb and distal side radial bearings 3rb and/or between proximal and distal side axial bearings 3ab. In some embodiments, the radial bearings 3rb can be magnetic radial bearings 3rb and the axial bearings 3ab can be magnetic axial bearings 3ab. In other embodiments, the radial and axial bearings 3rb and 3ab can be other types of radial and axial bearings (e.g. oil bearings).

The electricity generation portion of the shaft 3*shaft* can include an array of magnets 3m attached to the shaft 3*shaft*. The magnets 3m can be positioned in an electricity generation side region of the shaft 3*shaft*. The array of magnets 3m can include an arrangement of magnets that have alternating opposite polarities defined along a circumference or perimeter of the shaft so that rotation of the shaft can cause an alternation to a magnetic field that can be emitted in the electricity generation portion of the shaft 3*shaft* region for interacting with the magnets to facilitate generation of alternating current (AC). For instance, the array of magnets can include magnets that are positioned so each north polarity magnet is between immediately adjacent south polarity magnets and each south polarity magnet is between immediately adjacent north polarity magnets along a perimeter or circumference of the shaft. The array of magnets 3m can include magnets positioned along the circumference, or perimeter of the shaft in such an arrangement. The magnets can be positioned to extend along a length of the shaft. There can be a single array of such magnets 3m or multiple arrays of such magnets 3m positioned around the shaft.

In some embodiments, it is contemplated that the array of magnets 3m attached to the shaft 3*shaft* can alternatively include an arrangement of magnets 3m that utilize similar polarities, or the same polarity, to help facilitate generation of a direct current (DC) via rotation of the shaft 3*shaft* within a magnetic field generated in the electricity generation side 3gs of apparatus around the electricity generation portion of the shaft 3*shaft*.

Each of the magnets 3m can be magnetic bodies have a particular type of magnetic polarity or other type of magnet. In some embodiments, the magnets 3m can be permanent magnets that have polarities that are not changeable. In some embodiments, the magnets can be other types of magnets (e.g. different types of magnetic members or bodies).

Hydrogen can be present in the electricity generation side 3egs. For instance, a flow of hydrogen can be utilized in conjunction with the seal 4s to help provide a seal between the expander side 3a and the electricity generation side 3egs and some of this hydrogen can pass into the electricity generation side. Also, the seal 4s may not be a perfect seal (e.g. there may be some minimal loss of hydrogen that passes out of the expander side through the seal). Small amounts of hydrogen may therefore also leak through the seal 4s and pass into the electricity generation side 3egs even though the seal 4s can work effectively. Because hydrogen attacks rare earth magnets and can interact with the magnets 3m to physically break down the magnet material, we determined that the magnets 3m can be protected from exposure to hydrogen that may pass into the electricity generation side 3egs to separate the magnets from the hydrogen environment to help ensure reliable operation and avoid damage to the magnets 3m. Protection of the magnets 3m can also allow hydrogen to be utilized for a cooling function within the electricity generation side 3egs, which can be another benefit to this approach.

To help protect the magnets 3m from exposure to hydrogen, a sleeve 3s can be attached to the shaft 3*shaft* to cover the magnets 3m attached to the shaft 3*shaft*. The sleeve can be configured to help encapsulate the magnets 3m so the magnets are enclosed by the shaft 3*shaft* and the sleeve 3s. The sleeve 3s can have a proximal end nearest the seal 4s and expander side 3a and a distal end opposite its proximal end that is farthest from the seal 4s and expander side 3a. The magnets 3m can be positioned between the proximal end of the sleeve 3s and the distal end of the sleeve 3s. The opposite proximal and distal ends of the sleeve 3s can also be referred to as opposite first and second ends of the sleeve 3s.

The electricity generation side 3egs of the apparatus can also include a coil stator 3cs positioned around the periphery of the shaft 3*shaft* coincident in location with the array of magnets 3*m* attached to the shaft 3*shaft*. The coil stator 3*cs* can include a plurality of turns of a conductor. The coil stator 3*cs* can include one or more windings of coiled conductors. Each winding can include a plurality of turns of a conductor.

The coil stator 3*cs* can be spaced from the shaft 3*shaft* so that there is a gap between the shaft 3*shaft* and the inner portion of the coil stator 3*cs*. The coil stator 3*cs* can be positioned to define in inner space in which the shaft is positioned so that the coil stator encloses the portion of the shaft 3*shaft* that has the array of magnets 3*m* attached thereto. In some embodiments, a heat exchanger 3*hx* can be positioned adjacent an outer side of the coil stator 3*cs* such that the coil stator 3*cs* is positioned between the heat exchanger 3*hx* and the shaft 3*shaft*. The heat exchanger 3*hx* can be positioned and configured to cool the coil stator 3*cs* during operation to prevent it from overheating and/or to maintain the temperature of the coil stator 3*cs* within a desired pre-selected operating temperature range. In other embodiments, the heat exchanger 3*hx* may not be utilized as it may not be need to provide cooling as cooling of the coil stator 3*s* can be provided via conduction, convection, or other heat transfer mechanism.

The coil stator 3*cs* can be positioned to interact with a rotating magnetic field provided by rotation of the array of magnets 3*m* attached to the shaft 3*shaft* that is driven by expansion of the hydrogen in the hydrogen side 3*a* of the expander. The coil stator 3*cs* can be configured to convert this rotating electric field to electric current for transmission to one or more other devices of the plant and/or to an electric grid.

It should be appreciated that the magnets 3*m* and coil stator can be components of a magnetic motor and energy conversion system (MMECS) of the hydrogen expander magnetic generator apparatus 3. The MMECS can be configured to generate electrical current to provide electricity to the grid and/or to one or more other devices of the plant 1.

The expander side 3*a* of the hydrogen expander magnetic generator apparatus 3 can expand hydrogen fed therein. In conjunction with operation of the expander side 3*a*, hydrogen can be passed along the seal 4*s* via a hydrogen seal flow 4*hsf*. This flow of hydrogen can be passed to the seal 4*s* to help provide a sealing function for the hydrogen being expanded in the expansion side 3*a* in conjunction with the seal 4*s*. A portion of this flow of hydrogen that is fed to help provide a seal at the seal 4*s* can pass along the shaft 3*shaft* between the shaft 3*shaft* and the seal 4*s*. This flow of hydrogen can pass beyond the seal 4*s*. A first portion of the hydrogen that flows toward the seal 4*s* and the expander side 3*a* can be output from the apparatus 3 as a hydrogen return flow 4*hrf* based on the position and configuration of the seal 4*s* and radial bearings 3*rb* and axial bearings 3*ab* positioned adjacent the shaft 3*shaft* and the electricity generation side 3*egs* portion of the seal 4*s* that is opposite the expander side 3*a* facing portion of the seal 4*s*.

A second portion of this hydrogen seal flow can pass along the shaft through the bearings and pass along the shaft 3*shaft* within the space (or gap) between the shaft 3*shaft* and the coil stator 3*cs*. This second portion of the hydrogen seal flow can be a hydrogen cooling flow 4*hcf* that can pass along the shaft 3*shaft* and inner side of the coil stator 3*cs* by passing through a gap defined between a sleeve 3*s* attached to the shaft 3*shaft* and the coil stator 3*cs*. After passing along the sleeve 3*s*, the coil stator 3*cs*, and the shaft 3*shaft* via the gap, the hydrogen cooling flow 4*hcf* can be guided to be discharged away from the shaft 3*shaft* adjacent a terminal end region of the coil stator between the coil stator 3*cs* and one or more distal radial bearings 3*rb* as shown, for example, in FIG. 2. Before passing through the gap defined between the sleeve 3*s* and the coil stator 3*cs*, the hydrogen cooling flow 4*hcf* can pass along the shaft from the seal 4*s* to the gap by passing along the shaft 3*shaft* through at least one radial bearing 3*rb* and at least one axial bearing 3*ab* positioned between the seal 4*s* and the magnets 3*m*.

In some embodiments, the apparatus can be configured so that the hydrogen return flow 4*hrf* is not be utilized. For example, a non-hydrogen media (e.g. nitrogen or argon) can be fed toward the seal 4*s* to capture hydrogen from the hydrogen seal flow 4*hsf* and mix with it to form a mixture (e.g. a mixture of nitrogen and hydrogen or a mixture of argon and nitrogen, etc.). The non-hydrogen media can be injected so that this formed mixture is output from another port or orifice in fluid communication with the seal 4*s* nitrogen for being passed elsewhere in the plant 1. As another example, the entirety of the reverse flow from 4*hrf* could be avoided from being used and could instead be passed into the electricity generation side 3*gs* as the hydrogen cooling flow 4*hcf* (in which case, the entirety of this flow of hydrogen would pass from the seal 4*s* and be fed into the electricity generation side as the hydrogen cooling flow).

In yet other embodiments, other type of seal arrangements can be utilized for the seal 4*s*. Such embodiments may not require any flow of hydrogen or other fluid to provide the sealing function. In such embodiments, a cooling flow of hydrogen 4*hcf* can still be injected into the electricity generation side 3*gs* to provide cooling via a hydrogen cooling flow inlet. In yet other embodiments, no cooling flow may be provided. However, the risk of hydrogen exposure within the electricity generation side 3*gs* can still exist as the seal 4*s* may not provide a complete seal (e.g. there may be some minimal leakage of hydrogen from the expander side 3*a* that passes into the electricity generation side 3*gs*).

As can be appreciated from the above, the hydrogen cooling flow 4*hcf* (or another flow of hydrogen that may be present due to the seal 4*s* not providing a complete seal at the expander side 3*a*) can cause corrosion or damage to the magnets 3*m*. The sleeve 3*s* can be attached to the shaft to cover the magnets 3*m* and protect them from the hydrogen to avoid such corrosion or other damage. The sleeve 3*s* can be positioned on an outer side (e.g. an external surface) of the shaft and extend along an outer periphery of the shaft 3*shaft* to entirely cover the magnets 3*m* attached to the shaft to encase the magnets between the sleeve 3*s* and the shaft (e.g. between the sleeve 3*s* and the body of the shaft 3*shaft* to which the magnets 3*m* are attached). The magnets 3*m* can be entirely encased so they are not exposed to any of the hydrogen as the hydrogen cooling flow 4*hcf* passes along the sleeve 3*s*, shaft 3*shaft* and coil stator 3*cs*.

The sleeve 3*s* can be an annular shaped structure that is composed of metal, a composite material, or other suitable material. The sleeve 3*s* can be attached to the shaft 3*shaft* for encasing the magnets 3*m* fully between the outer sleeve 3*s* and inner body of the shaft 3*shaft* by a number of different sleeve attachment mechanisms 5*sa*. These sleeve attachment mechanisms 5*sa* can include, for example, welding, brazing, cladding, coating, polymer/epoxy clamps, metallic or composite windings, metallic or composite sealing elements, and/or a shrink fit bonding between the sleeve 3*s* and the shaft 3*shaft* to overlay the sleeve 3*s* over the magnets 3*m*. The sleeve 3*s* to shaft 3*shaft* sleeve attachment mechanisms 5*sa* can also (or alternatively) utilize sleeve end joints, sleeve end cuffs, and/or grooved inner interference fits for defining interference attachment at opposite ends of the sleeve to different spaced apart portions of the shaft 3*shaft* for positioning the magnets 3*m* between these opposite ends of the sleeve 3*s* between the sleeve 3*s* and the body of the shaft 3*shaft*. It should be appreciated that the sleeve attachment mechanism 5*sa* for attachment of the sleeve 3*s* to the shaft 3*shaft* can also utilize a single type of such mechanisms or combination of these attachment mechanisms (e.g. two or more of the above mentioned exemplary sleeve attachment mechanisms).

FIGS. 3-7 illustrate examples of exemplary sleeve attachment mechanisms 5*sa* for attachment of the sleeve 3*s* to the shaft 3*shaft* for completely encapsulating the magnets 3*m* attached to the shaft 3*shaft*. The sleeve 3*s* positioned on the shaft and attached to the shaft 3*shaft* via the at least one sleeve attachment mechanism 5*sa* can help protect the magnets 3*m* from the hydrogen of the hydrogen cooling flow 4*hcf* that may pass along the shaft 3*shaft* and coil stator 3*cs*.

Figure 3:
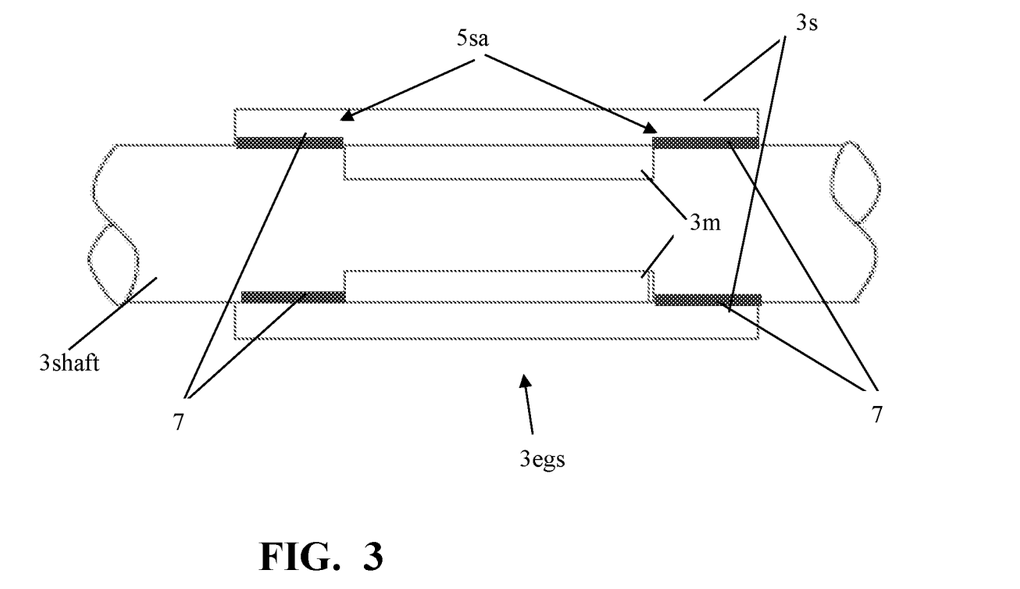
FIG. 3 is a fragmentary schematic diagram of an exemplary embodiment of the hydrogen expander magnetic generator apparatus 3 illustrating a first exemplary sleeve arrangement for attachment and protection of magnets attached to the shaft.

Referring to FIG. 3, the sleeve 3*s* can be bonded and shrink fit to the shaft 3*shaft* via bonding attachments 7 defined between proximal and distal ends of the sleeve and coincident portions of the shaft 3*shaft*. The locations of the bonding attachments 7 can be positioned so that the magnets 3*m* are between the proximal end and distal end bonding attachments 7. The bonding attachments 7 shown in FIG. 3 can be a bonded shrink fit attachment provided via a polymer/epoxy bonding, a metallic plating, a metallic foil, a metallic strip, adhesive material (e.g. glue or tape), or brazing, for example.

Figure 4:
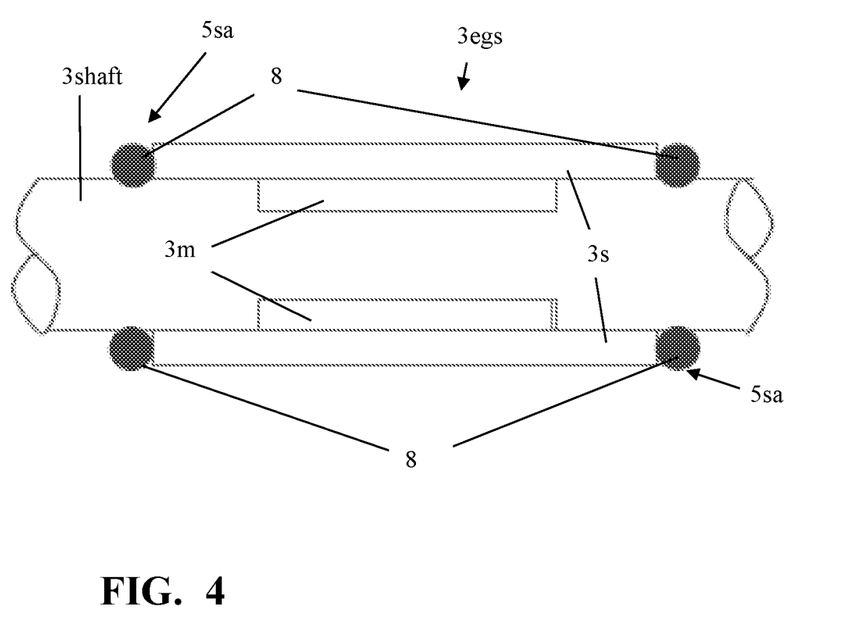
FIG. 4 is a fragmentary schematic diagram of an exemplary embodiment of the hydrogen expander magnetic generator apparatus 3 illustrating a second exemplary sleeve arrangement for attachment and protection of magnets attached to the shaft.

Referring to FIG. 4, the sleeve 3*s* can be integrally attached to the shaft 3*shaft* via sleeve end joints 8 defined between proximal and distal ends of the sleeve and coincident portions of the shaft 3*shaft*. The locations of the sleeve end joints 8 can be positioned so that the magnets 3*m* are between the proximal and distal sleeve end joints 8. The sleeve end joints 8 shown in FIG. 4 can be defined by welding, brazing, or cladding, for example. It is also contemplated that the sleeve end joints 8 can be defined by an epoxy or other type of polymeric bonding, a seal or a sealing element positioned to define the sleeve end joints 8. The sleeve end joints 8 can be utilized alone or in combination with other sleeve attachment mechanisms 5*sa* (e.g. bonding attachments 7, etc.).

Figure 5:
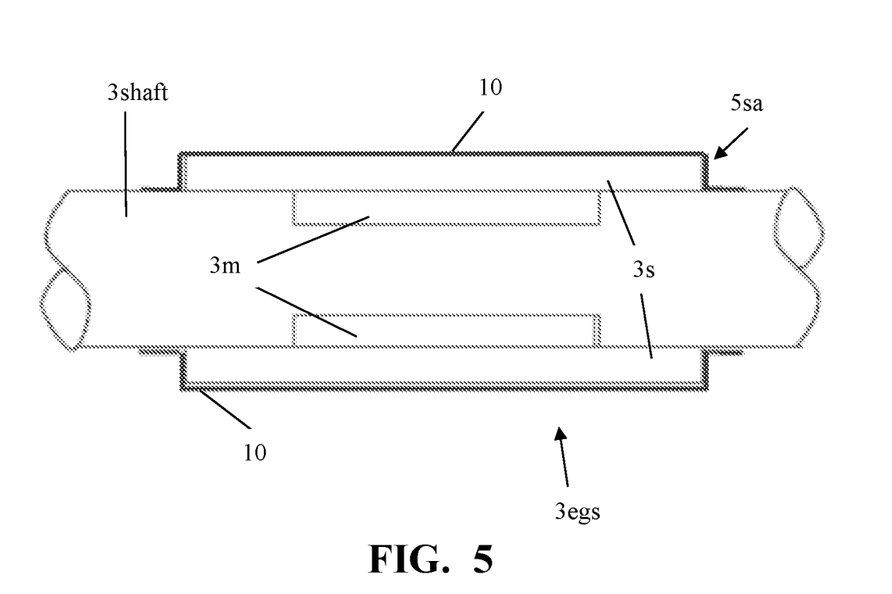
FIG. 5 is a fragmentary schematic diagram of an exemplary embodiment of the hydrogen expander magnetic generator apparatus 3 illustrating a third exemplary sleeve arrangement for attachment and protection of magnets attached to the shaft.

Referring to FIG. 5, the sleeve attachment mechanism 5*sa* can include an overcoating 10 that overcoats the sleeve 3*s* for attaching the sleeve 3*s* to the shaft 3*shaft*. The overcoating 10 can be provided by cladding, coating, or metallic plating for example. The overcoating can be a coating, or covering, that covers an entirety of the sleeve 3*s* and portions of the shaft 3*shaft* at the terminal opposite ends of the sleeve 3*s* for securing the sleeve 3*s* over the shaft 3*shaft* for completely covering all of the magnets 3*m* attached to the shaft 3*shaft*. The overcoating 10 can be utilized alone or in combination with other attachment mechanisms (e.g. bonding attachments 7 and/or sleeve end joints 8, etc.).

Figure 6:
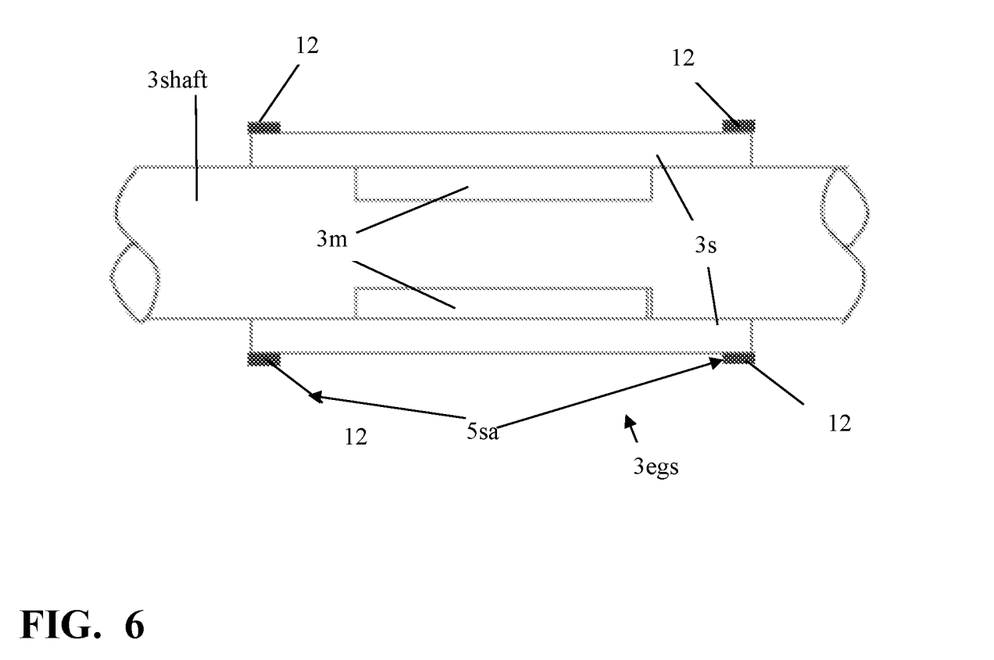
FIG. 6 is a fragmentary schematic diagram of an exemplary embodiment of the hydrogen expander magnetic generator apparatus 3 illustrating a fourth exemplary sleeve arrangement for attachment and protection of magnets attached to the shaft.

Referring to FIG. 6, the sleeve attachment mechanism 5*sa* can include sleeve end cuffs 12 positioned at terminal ends of the sleeve 3*s* at the sleeve's opposite proximal end nearest the seal 4*s* and expander side 3*a* and the sleeve's distal end farthest from the seal 4*s* and expander side 3*a*. The sleeve end cuffs 12 can be positioned at terminal end regions of the sleeve 3*s* for directly contacting the sleeve's outer side. The sleeve end cuffs can be wound around the entirety of the terminal end regions along a circumference or other perimeter of the sleeve at the terminal end regions for providing a compression force at those locations to help maintain the position of the sleeve 3*s* on the shaft 3*shaft*. The sleeve end cuffs 12 can be utilized in conjunction with bonding, welding, or other type of integral attachment that may be provided via an inner side of the sleeve 3*s* and the body of the shaft 3*shaft* (e.g. overcoating 10, bonding attachments 7, and/or sleeve end joints 8, etc.). The sleeve end cuffs 12 can be defined by composite windings, metal windings, or other type of cuff structure that helps attach the end portions of the sleeve 3*s* to the shaft 3*shaft*.

Figure 7:
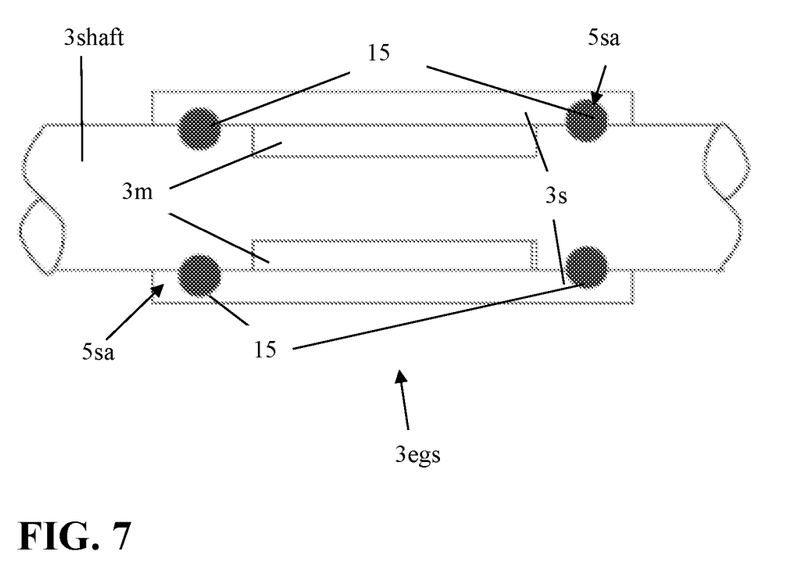
FIG. 7 is a fragmentary schematic diagram of an exemplary embodiment of the hydrogen expander magnetic generator apparatus 3 illustrating a fifth exemplary sleeve arrangement for attachment and protection of magnets attached to the shaft.

Referring to FIG. 7, the sleeve attachment mechanism 5*sa* can include spaced apart sealing elements 15. The sealing elements 15 can be positioned within grooves defined in the shaft 3*shaft* and sleeve 3*s* for positioning the sealing elements 15 between the shaft 3*shaft* and sleeve 3*s* so the magnets 3*m* are located between proximal and distal sealing elements 15 located at opposite terminal end regions of the sleeve 3*s*. This type of attachment mechanism 5*sa* can also be utilized in conjunction with the sleeve end cuffs 12 and/or overcoating 10. The sealing elements 15 can also (or alternatively) be utilized in conjunction with bonding attachments 7 and/or sleeve end joints 8.

Each of the sealing elements 15 can be provided so that a sealing element is positioned within grooves defined in the shaft body 3*shaft* and sleeve 3*s* at proximal and distal ends of the sleeve 3*s* and coincident locations of the shaft 3*shaft* that align with these portions of the sleeve 3*s* so the sealing elements 15 can be positioned in corresponding grooves for being retained between the sleeve 3*s* and the shaft 3*shaft* so the magnets 3*m* are located between the sealing elements within these grooves. The sealing elements can be annular seal bodies, metallic O-rings, composite O-rings, or other type of seal element positionable within coincident grooves defined in the outer side of the body of the shaft 3*shaft* and terminal end regions of the inner side of the sleeve 3*s* so that the magnets 3*m* are located between the sealing elements 15, sleeve 3*s* and the body of the shaft 3*shaft* for being fully encapsulated by these structures. The grooves that are defined in the outer side of the body of the shaft 3*shaft* and terminal end regions of the inner side of the sleeve 3*s* can alternatively (or additionally) include offset grooves designed to help create a seal. Such offset grooves can be utilized in addition to the coincident grooves or as an alternative to them.

In some embodiments, the sealing elements 15 can be configured to facilitate an interference attachment and/or mating interlock attachment of the sleeve 3*s* to the shaft 3*shaft*. Such a connection can be facilitated by cooperating mating engagement (e.g. contact) between the sealing elements and profiles of the grooves defined in the sleeve 3*s* and shaft 3*shaft*, for example. In other embodiments, the sealing elements 15 can be provided to help provide additional seals for the magnets 3*m* in conjunction with the use of other sleeve attachment mechanisms 5*sa* (e.g. sleeve end joints 8, bonding attachments 7, overcoating 10, etc.).

Embodiments of our hydrogen expander magnetic generator apparatus 3 can be configured for high speed shaft rotation. Some embodiments can facilitate high rotational speeds of at least 20,000 revolutions per minute (RPM), of over 30,000 RPM, at least 60,000 RPM, between 50,000 RPM and 80,000 RPM, at least 80,000 RPM, up to 80,000 RPM, or other high speed rotation. Embodiments can be utilized in conjunction with turboexpanders and the high rotational speeds associated with such expanders, for example. Embodiments can also provide a reduced footprint for the expander and also provide improved energy use by permitting a recovery of energy from operation of the hydrogen expander and conversion of that energy into electricity.

It should be appreciated that embodiments of our hydrogen expander magnetic generator apparatus 3 and methods of making and using the same can each be configured to include process control elements positioned and configured to monitor and control operations (e.g. temperature and pressure sensors, flow sensors, an automated process control system having at least one work station that includes a processor, non-transitory memory and at least one transceiver for communications with the sensor elements, valves, and controllers for providing a user interface for an automated process control system that may be run at the work station and/or another computer device of the apparatus, etc.).

It should also be appreciated that modifications to the embodiments explicitly shown and discussed herein can be made to meet a particular set of design objectives or a particular set of design criteria. For example, the arrangement and type of bearings, seals, coil stator, shaft configuration, and heat exchanger configuration can be selected to meet a particular layout design that accounts for available area for the apparatus and other design considerations. As another example, the flow rate of hydrogen, pressure, and temperature of the hydrogen passed through the different elements of the apparatus can vary to account for different design configurations and other design criteria. As yet another example, the material composition for the different structural components of the apparatus can be any type of suitable materials as may be needed to meet a particular set of design criteria.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of our hydrogen expander magnetic generator apparatus and methods of making and using the same have been shown and described above, it is to be distinctly understood that the invention is not limited thereto but may be otherwise variously embodied and practiced within the scope of the following claims.

What is claimed is:

1. A hydrogen expander magnetic generator apparatus comprising:
   a rotatable shaft extending from an expander side adjacent a seal, the shaft having a plurality of magnets attached thereto in an electricity generation side region of the shaft;
   a sleeve attached to the shaft via at least one sleeve attachment mechanism such that the magnets are completely enclosed between the sleeve and the shaft to prevent hydrogen ingress into the magnets;
   a coil stator spaced apart from the shaft such that the sleeve is positioned between the coil stator and the shaft and there is a gap defined between the coil stator and the sleeve;
   wherein the seal is positioned such that a hydrogen cooling flow is passable along the shaft from the expander side through the gap;
   wherein at least one radial bearing positioned adjacent the shaft between the seal and the magnets and at least one axial bearing positioned adjacent the shaft between the seal and the magnets;
   wherein the seal is positioned such that the hydrogen cooling flow passes along the at least one radial bearing and the at least one axial bearing as is passes from the seal to the gap; and
   wherein the hydrogen expander magnetic generator apparatus is a turboexpander or is incorporated into a turboexpander.

2. The hydrogen expander magnetic generator apparatus of claim 1, wherein the magnets are permanent magnets.

3. The hydrogen expander magnetic generator apparatus of claim 1, wherein the magnets include north polarity magnets and south polarity magnets, the magnets being positioned along a circumference of the shaft or a periphery of the shaft so each north polarity magnet is between immediately adjacent south polarity magnets and each south polarity magnet is between immediately adjacent north polarity magnets along a perimeter or circumference of the shaft.

4. The hydrogen expander magnetic generator apparatus of claim 1, comprising:
   at least one radial bearing positioned adjacent the shaft between the seal and the magnets and at least one axial bearing positioned adjacent the shaft between the seal and the magnets.

5. The hydrogen expander magnetic generator apparatus of claim 4, wherein the radial bearing is a magnetic radial bearing and the axial bearing is a magnetic axial bearing.

6. The hydrogen expander magnetic generator apparatus of claim 1, wherein the at least one sleeve attachment mechanism comprises at least one of:
   bonding attachments;
   sleeve end joints;
   an overcoating;
   sleeve end cuffs; and
   sealing elements.

7. The hydrogen expander magnetic generator apparatus of claim 1, wherein the at least one sleeve attachment mechanism comprises at least two of:
   bonding attachments;
   sleeve end joints;
   an overcoating;
   sleeve end cuffs; and
   sealing elements.

8. A method of generating electricity via expansion of hydrogen via a hydrogen expander magnetic generator apparatus, the method comprising:
   expanding hydrogen within an expander side of an expander, the expander having:
      a rotatable shaft extending from the expander side adjacent a seal, the shaft having a plurality of magnets attached thereto in an electricity generation side region of the shaft; and
      a sleeve attached to the shaft via at least one sleeve attachment mechanism such that the magnets are completely enclosed between the sleeve and the shaft; and
      the expanding of the hydrogen performed such that a hydrogen cooling flow passes along the shaft to the electricity generation side region of the shaft; and
   wherein the hydrogen cooling flow passes between a gap defined between the sleeve and a stator positioned adjacent the sleeve and spaced apart from the sleeve; and
   wherein the hydrogen cooling flow passes along at least one radial bearing and at least one axial bearing as the hydrogen cooling flow passes along the shaft to the electricity generation side region of the shaft.

9. The method of claim 8, wherein the stator is a coil stator.

10. The method of claim 9, wherein the at least one radial bearing is between the seal and the magnets and the at least one axial bearing is between the seal and the magnets.

11. The method of claim 8, wherein the magnets are permanent magnets.

12. The method of claim 8, wherein the sleeve is attached to the shaft via the at least one sleeve attachment mechanism, the at least one sleeve attachment mechanism being provided at opposite end regions of the sleeve.

13. The method of claim 12, wherein the at least one sleeve attachment mechanism comprises at least one of:
   bonding attachments;
   sleeve end joints;
   an overcoating;
   sleeve end cuffs; and
   sealing elements.

14. The method of claim 12, wherein the at least one sleeve attachment mechanism comprises at least two of:
   bonding attachments;
   sleeve end joints;
   an overcoating;
   sleeve end cuffs; and
   sealing elements.

15. A hydrogen expander magnetic generator apparatus comprising:
   a rotatable shaft extending from an expander side adjacent a seal, the shaft having a plurality of permanent magnets attached thereto in an electricity generation side region of the shaft;
   a sleeve attached to the shaft via at least one sleeve attachment mechanism such that the magnets are completely enclosed between the sleeve and the shaft;
   a stator spaced apart from the shaft such that the sleeve is positioned between the stator and the shaft and there is a gap defined between the stator and the sleeve;
   wherein the seal is positioned such that a hydrogen cooling flow is passable along the shaft from the expander side through the gap;
   at least one radial bearing positioned adjacent the shaft between the seal and the magnets;
   at least one axial bearing positioned adjacent the shaft between the seal and the magnets; and
   wherein the seal is positioned such that the hydrogen cooling flow passes along the at least one radial bearing and the at least one axial bearing as the hydrogen cooling flow passes from the seal to the gap.

16. The hydrogen expander magnetic generator apparatus of claim 15, wherein the hydrogen expander magnetic generator apparatus is a turboexpander or incorporated in a turboexpander.

17. The hydrogen expander magnetic generator apparatus of claim 15, wherein:
   the at least one radial bearing comprises an oil bearing or a magnetic bearing and the at least one axial bearing comprises a magnetic bearing or an oil bearing; and
   the sleeve is attached to the shaft via at least one sleeve attachment mechanism provided at opposite end regions of the sleeve, the at least one sleeve attachment mechanism selected from the group consisting of:
   bonding attachments;
   sleeve end joints;
   an overcoating;
   sleeve end cuffs;
   sealing elements; and
   combinations thereof.

* * * * *